US006973368B2

(12) United States Patent
Schwesig

(10) Patent No.: US 6,973,368 B2
(45) Date of Patent: Dec. 6, 2005

(54) METHOD AND DEVICE FOR RELIABLY SWITCHING AN OPERATING MODE OF AN INDUSTRIAL CONTROLLER FOR MACHINE TOOLS OR PRODUCTION MACHINES

(75) Inventor: Günter Schwesig, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/816,778

(22) Filed: Apr. 2, 2004

(65) Prior Publication Data

US 2004/0230329 A1 Nov. 18, 2004

(30) Foreign Application Priority Data

Apr. 4, 2003 (DE) ................................ 103 15 526

(51) Int. Cl.[7] ................................ H04L 19/32
(52) U.S. Cl. ................................ 700/180; 713/200
(58) Field of Search ................................ 700/17, 79, 83, 700/180, 237; 713/182–186, 200–202; 705/18

(56) References Cited

U.S. PATENT DOCUMENTS

| | | | | |
|---|---|---|---|---|
| 3,415,087 A | | 12/1968 | Kramasz et al. | |
| 3,725,877 A | * | 4/1973 | Keil | 345/169 |
| 3,847,262 A | * | 11/1974 | Higgins | 400/104 |
| 4,023,139 A | * | 5/1977 | Samburg | 340/506 |
| 4,916,639 A | | 4/1990 | Yoneda et al. | |
| 5,107,435 A | * | 4/1992 | Yamada | 700/180 |
| 5,249,230 A | * | 9/1993 | Mihm, Jr. | 380/249 |
| 5,280,527 A | * | 1/1994 | Gullman et al. | 713/184 |
| 5,319,705 A | * | 6/1994 | Halter et al. | 705/54 |
| 5,402,490 A | * | 3/1995 | Mihm, Jr. | 380/247 |
| 6,301,665 B1 | * | 10/2001 | Simonich et al. | 713/200 |
| 2002/0129285 A1 | * | 9/2002 | Kuwata et al. | 713/202 |
| 2004/0268133 A1 | * | 12/2004 | Lee et al. | 713/186 |

FOREIGN PATENT DOCUMENTS

| | | |
|---|---|---|
| DE | 200 18 584 U1 | 3/2001 |
| DE | 100 09 456 A1 | 9/2001 |
| DE | 101 31 594 A1 | 11/2002 |

* cited by examiner

*Primary Examiner*—Maria N. Von Buhr
(74) *Attorney, Agent, or Firm*—Henry M. Feiereisen

(57) ABSTRACT

A method and a device for securely switching between operating modes of an industrial controller for machine tools or production machines are described. Before the operating mode is switched, the operator is identified by identification means that transmit to an operator's console of the controller a redundant binary enable signal after a successful identification. The operator is allowed to switch between operating modes by using the keys of the operator's console implemented in safe technology as long as the enable signal is received and is error-free. With the method and the device, the operating modes of an industrial controller for machine tools or production machines can be easily, reliably and cost-effectively switched.

8 Claims, 2 Drawing Sheets

Prior Art

FIG 3
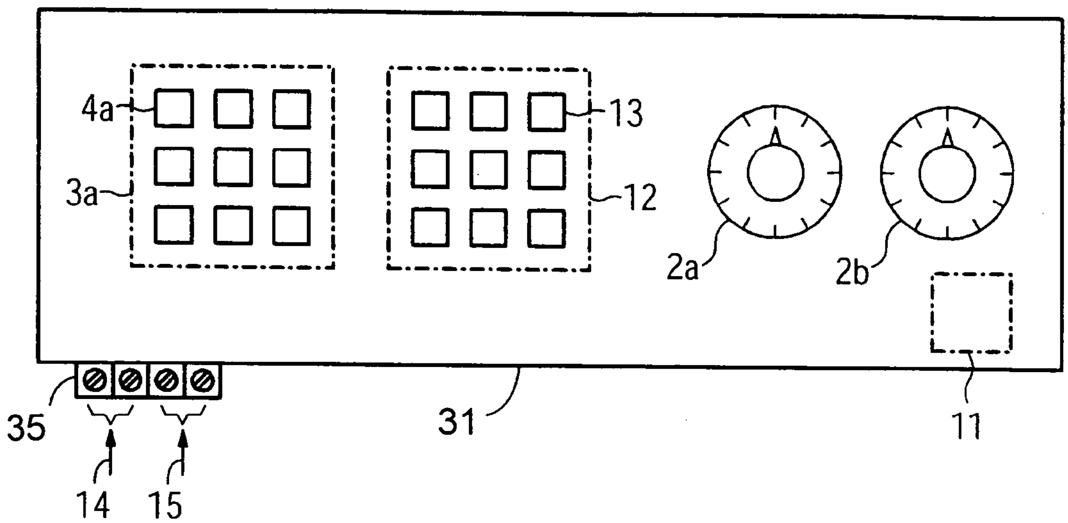
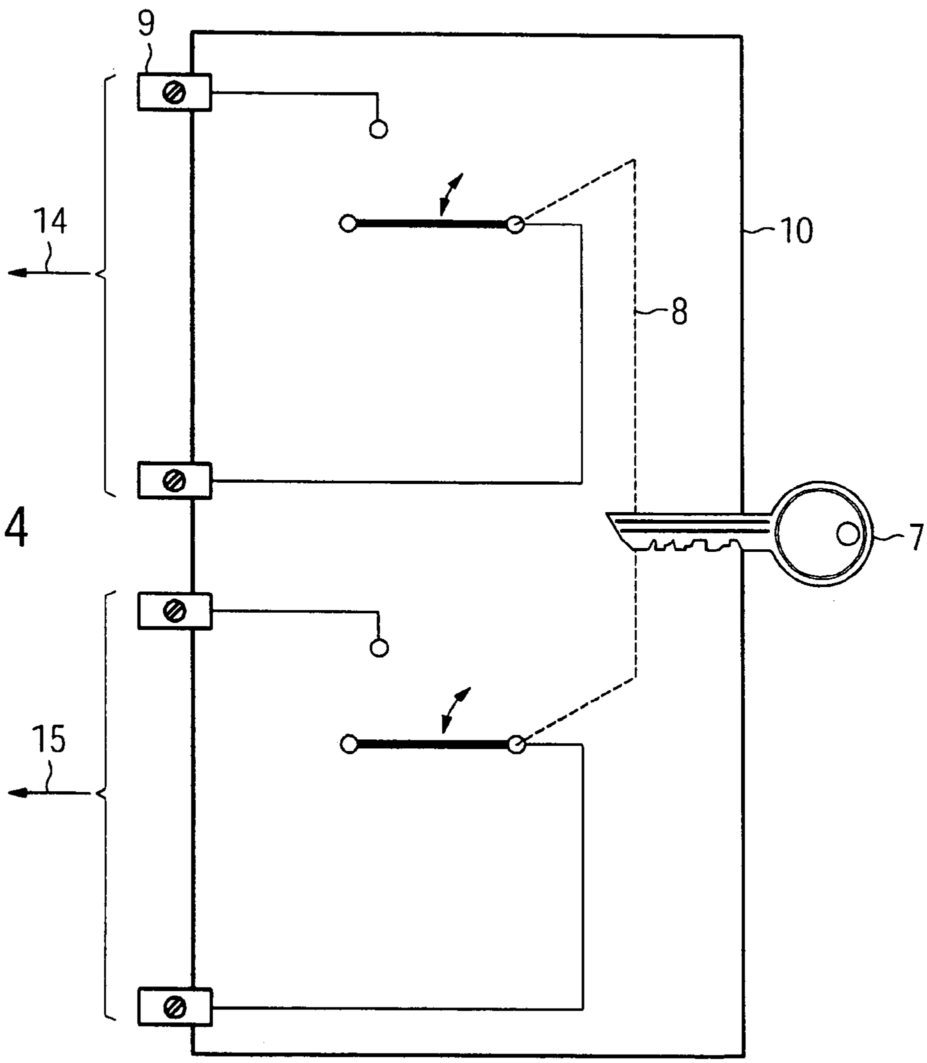
FIG 4

METHOD AND DEVICE FOR RELIABLY SWITCHING AN OPERATING MODE OF AN INDUSTRIAL CONTROLLER FOR MACHINE TOOLS OR PRODUCTION MACHINES

CROSS-REFERENCES TO RELATED APPLICATIONS

This application claims the priority of German Patent Application, Serial No. 103 15 526.0, filed Apr. 4, 2003, pursuant to 35 U.S.C. 119(a)–(d), the disclosure of which is incorporated herein by reference.

BACKGROUND OF THE INVENTION

The present invention relates to a method and a device for reliably switching an operating mode of an industrial controller for a machine tool or production machines. In the following description, the term "production machine" is used in a generic sense and includes robots which generally follow the concepts outlined here.

Machine tools and production machines require certain safety procedures for their operation to protect people from dangerous movements of workpieces and machine elements. In particular, the safety procedures are intended to prevent unintended movements of workpieces or machine elements that could endanger an operator.

Each machine has several operating modes, for example automatic production, setup mode and manual mode. The settings for the various protective measures, such as the maximum permitted travel path or the maximum permitted travel speed, are defined when the desired operating mode is selected. Only qualified personnel especially trained for operating the machine should be allowed to select or switch the operating mode. In general, modern industrial controllers for machine tools or production machines have key authentication switches with redundantly implemented, galvanically separated contacts for safely selecting and/or switching the operating mode. For operating the controller, the various contacts are each connected individually to a control panel, whereby the controller properly evaluates and processes the switch position of the key authentication switch. Read errors, wiring defects and switch malfunctions are identified by comparing the two read-in switch position values.

FIG. 1 shows a conventional operator's console 1 of an industrial controller for machine tools or production machines. The operator's console 1 includes essentially two rotary switches 2*a* and 2*b,* and a standard keypad 3*a* with nine standard keys, whereby for sake of clarity only one standard key 4*a* is labeled, and another standard key pad 3*b* that also includes nine keys, whereby also only one key 4*b* is labeled for sake of clarity. The operator's console also includes a terminal strip 5 with eight individual contacts.

FIG. 2 shows a three-step key authentication switch 6. The three-step key authentication switch 6 has eight contacts, wherein only one contact 9 is labeled for sake of clarity. A mechanical coupling 8 is provided to ensure that the upper four contacts are switched synchronously with the lower four contacts when the key 7 is turned, as depicted in FIG. 2. The eight contacts of the three-step key authentication switch 6 are electrically connected separately with a corresponding single contact of a terminal strip 5, as shown in FIG. 1. A total of eight electrically conducting connections between the operator's console 1 and the three-step key authentication switch 6 are required in order to switch between the two different operating modes. A single operating mode is associated with each step of the key authentication switch 6.

Only one qualified operator has the key 7 and can select the desired operating mode by turning the key 7. Two corresponding redundant contacts and one operating mode are associated with each switch position. The contacts are connected via two electrically conducting, galvanically separated connections to an operator's console with failsafe inputs. The signals from the contacts are evaluated and processed in the operator's console and/or the controller. A device of this type and a corresponding method for securely switching between operating modes of an industrial controller for machine tools or production machines, however, has several disadvantages. These are in particular:

- High cost of the three-step or multi-step redundant key authentication switch.
- Large installation size of the three-step or multi-step redundant key authentication switch.
- For each operating mode two contacts and/or two terminals are required on both the operator's console and the key authentication switch, hence requiring a large number of contacts (this does not include the two contacts for the power supply).
- Complicated wiring because of the need to provide per operating mode two electric connections between operator's console and key authentication switch (this does not include the two connections for the power supply).
- The switch position of the key authentication switch is oftentimes difficult to mark, since the switch is typically installed externally.
- The number of the operating modes is limited by the maximum number of possible steps of the key authentication switch.

It would therefore be desirable and advantageous to provide an a simple, safe and cost-effective device and method for safety switching between operating modes of an industrial controller for machine tools or production machines.

SUMMARY OF THE INVENTION

According to one aspect of the present invention, a method for securely switching between operating modes of an industrial controller for machine tools or production machines includes the steps of identifying an operator before switching between the operating modes and transmitting to an operator's console of the controller a redundant binary enable signal if the operator is successfully identified. If the operator's console receives the enable signal and determines that the enable signal is error-free, the operator is allowed to switch between the operating modes by using at least one key of the operator's console. The key is implemented in safe technology.

According to another aspect of the present invention, a device for securely switching between operating modes of an industrial controller for machine tools or production machines includes identification means for identifying an operator before switching between the operating modes and an operator's console of the controller that receives from the identification means a redundant binary enable signal if the operator is successfully identified. At least one key is located on the operator's console and implemented in safe technology. The key or keys enable the operator to switch between the operating modes if the operator's console receives from the identification means the enable signal and determines that the enable signal is error-free.

According to another advantageous feature of the present invention, the identification means can be externally connected to the operator's console. In this way, the number of identification means that can be connected to the operator's console is not limited.

According to yet another advantageous feature of the present invention, the identification means can include a key authentication switch, which are commonly used as identification means. Suitably, the key authentication switch can be a two-step key authentication switch, which can be quite cost-effective.

According to another feature of the present invention, the key identification switch can be a switch with a key that automatically returns to its rest position and interrupts the enable signal when the key is released. This forces the operator to use one hand to prevent the key from returning to its initial position when selecting a new operating mode, while selecting the new operating mode using the other hand. The operating mode can thereby be securely switched.

A user or operator can be reliably identified by using as an identification means an identification card or a transponder or a biometric method, in particular a fingerprint or a retina scan.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 is a schematic illustration of an operator's console with four contacts in accordance with the present invention; and FIG. 4 is a schematic illustration of a two-step key authentication switch with four contacts.

DETAILED DESCRIPTION OF PREFERRED EMBODIMENTS

Figure 1:
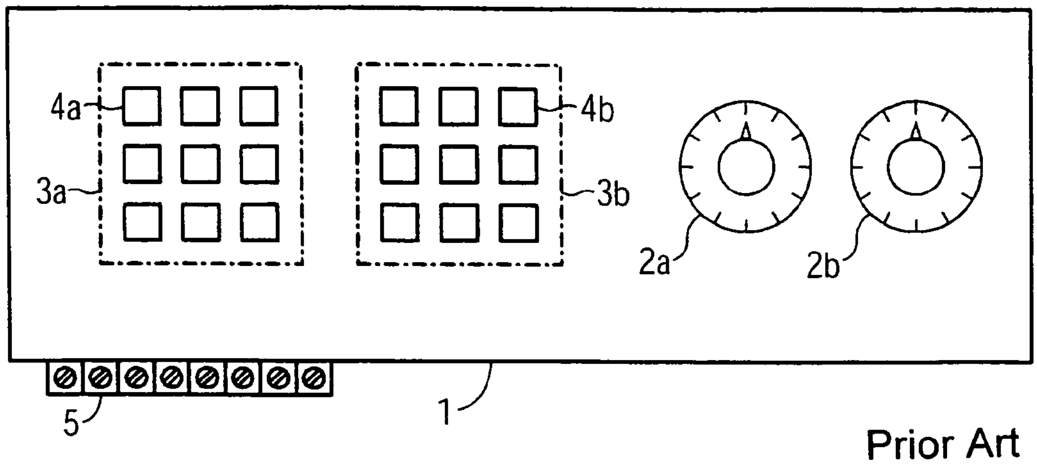
FIG. 1 is a schematic illustration of a conventional operator's console with eight contacts.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 3, there is shown a schematic illustration of an operator's console 31 according to the present invention, including two rotary switches 2*a* and 2*b*, a standard key pad 3*a* with nine standard keys, of which only one standard key 4*a* is labeled for sake of clarity. Parts corresponding with those in FIG. 1 are denoted by identical reference numerals and not explained again. The description below will center on the differences between the embodiments. In accordance with the present invention, the operator's console 31 has a key pad 12 that is implemented in a safe technology, with nine keys implemented in safe technology, of which only one key 13 is labeled for sake of clarity. In addition, the operator's console 31 has a terminal strip 35 with only for individual contacts.

To ensure clarity, it is necessary to establish the definition of the term "safe technology" that will be used throughout this disclosure. As already mentioned, the operator's console 31 of FIG. 3, unlike the operator's console 1 in FIG. 1, has two different key pads 3*a* and 12. The key pad 3*a* and the keys 4*a* of the key pad 3*a* are implemented as standard keys, whereas the key pad 12 and the associated keys 13 are implemented in the so-called safe technology. The keys 13 implemented in safe technology are read-in from the operator's console and/or the controller by special methods or procedures in a particularly secure and reliable manner. This can be achieved in different ways, for example, by providing the keys 13 with redundant contacts, as in the key authentication switch, and/or by reading the values in redundantly. In addition, the two read-in values in the operator's console and in the controller can be compared to thus identify a read error, a wiring defect and/or a switch malfunction. The additional expense for implementing the keys in safe technology as compared to standard technology is insignificant.

Figure 2:
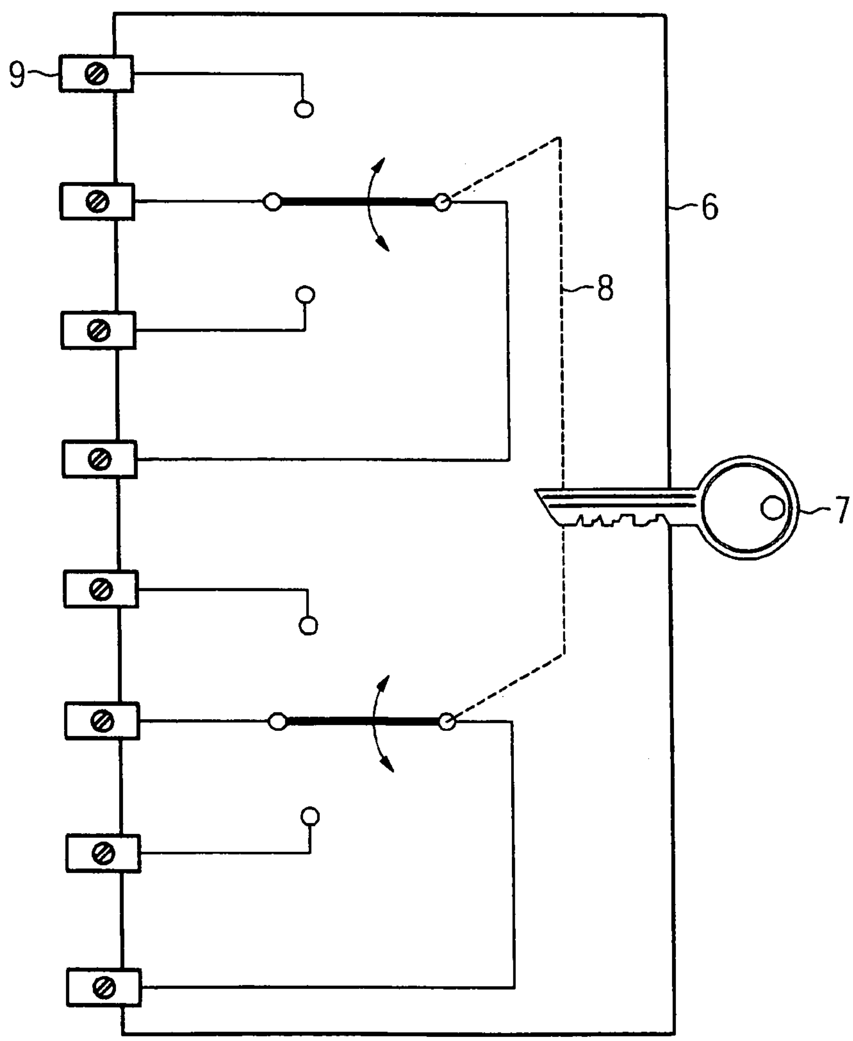
FIG. 2 is a schematic illustration of a conventional three-step key authentication switch with eight contacts.

FIG. 4 shows a functional circuit diagram of a two-step key authentication switch 10. This switch essentially corresponds to the three-step key authentication switch 6 depicted in FIG. 2. Each of the two contacts is switched redundantly and synchronously by a key 7 via a mechanical coupling 8. Unlike the three-step key authentication switch 6 depicted in FIG. 2, the two-step authentication switch 10 of FIG. 4 has only four contacts, with only one contact 9 labeled for sake of clarity.

The four contacts of the two-step key authentication switch 10 of FIG. 4 are each separately connected via a corresponding connection to respective contacts of the terminal block 5 of the operator's console 1, as depicted in FIG. 3.

If a qualified operator desires to switch the operating mode, then the operator inserts the key 7 into the two-step key authentication switch 10 and turns the key. In this way, the upper and lower contact of the two-step key authentication switch 10 of FIG. 4 are synchronously closed and a binary redundant enable signal, which consists of the two individual enable signals 14 and 15 depicted in FIG. 3 and FIG. 4, is transmitted to the operator's console 1 via the respective contacts. As long as the operator's console receives the redundant enable signal and does not detect an error in the enable signal (both of the enable signals 14 and 15 must have the same logical value, for example "0" or "1"), then all keys of the key pads 12 or a subset thereof constructed in safe technology are enabled and can be operated by the qualified operator.

In the depicted embodiments, one operating mode is associated with each enabled key that is configured with the safe technology. As long as the enable signal is applied, the operator can select the desired operating mode by pressing the corresponding key. However, instead of associating a single operating mode with each key as shown in the depicted exemplary embodiment, the same or an even greater number of operating modes than the afore-described nine different enabled operating modes (corresponding to the number of keys) can be defined and/or selected when using a menu that is controlled by the keys or by an even smaller number of keys.

After the operating mode is switched, the qualified operator returns the key 7 again into the initial position, thereby interrupting the enable signal and blocking the keys of the key pad 12.

Unlike conventional methods and devices, the methods and the device of the invention depicted in FIGS. 3 and 4 only require four contacts on the operator's console 1 and on the key authentication switch 10, so that a two-step key authentication switch can be used. In addition, in the depicted exemplary embodiment only four wired connections are required between the operator's console 1 and the two-step key authentication switch 10 (see FIGS. 3 and 4), instead of the eight connecting wires required in the conventional embodiment depicted in FIGS. 1 and 2.

This significantly reduces the cost and wiring complexity and improves the reliability.

In the depicted exemplary embodiment, an externally connected key authentication switch is provided as an identification means. However, it will be appreciated by those skilled in the art that the identification means or the key authentication switch can also be an integrated component of the operator's console 1. The contacts can then be located inside the housing of the operator's console 1 and are not visible to the externally located operator.

Instead of using a key authentication switch, the identification means can also be implemented as an identification card, a transponder or a biometric unit, such as a fingerprint or a retina scanner.

If the identification means is connected externally to the operator's console, then the identification means can be easily exchanged at a later time.

It will be understood that a three-step or multi-step key authentication switch can also be used instead of the two-step key authentication switch. The unused contacts of the key authentication switch are then not connected. Such a three-step or multi-step key authentication switch, however, can be expected to be more expensive than a two-step key authentication switch.

If the key authentication switch is implemented so that the key automatically returns to its initial position and the enable signal is interrupted when the key is released, then the user is forced to use both hands when switching between operating modes. The operator has to use one hand to hold the key in the turned position to prevent the key form returning to its initial position, while selecting using the other hand to select the operating mode with the keys 13 of the keypad 12 implemented with safe technology. This arrangement reduces the risk that the operating mode is switched unintentionally of by pressing the wrong key or by dropping objects on the keys.

If an identification card or a retina scan of the user's eye is used as identification means, then the enable signal can remain activated for a short time after the identification. This time should be sufficient to switch the operating mode, and giving the user with an unobstructed view of the keys to be pressed.

FIG. 3 shows an exemplary operator's console 1 with optional identification means in the form of a fingerprint scanner 11, schematically indicated by dotted lines. Optionally, the indicated fingerprint scanner 11 and the two-step key authentication switch 10 can also operate in parallel, so that the operator can use for identification, for example, either the fingerprint scan 11 or the two-step key authentication switch 10 or both, which provides additional security.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for securely switching between operating modes of an industrial controller for machine tools or production machines, comprising the steps of:

identifying an operator with a two-step key authentication switch before switching between the operating modes;

transmitting to an operator's console of the controller a redundant binary enable signal in the event of a successful identification of the operator; and if the operator's console receives the enable signal and determines that the enable signal is error-free, enabling the operator to switch between the operating modes by using at least one key of the operator's console, with the least one key being implemented in safe technology.

2. The method of claim 1, wherein the at least one key operating the two-step key authentication switch, when released, automatically returns to an initial position and interrupts the enable signal.

3. A device for securely switching between operating modes of an industrial controller for machine tools or production machines, comprising:

identification means with a two-step key authentication switch and at least one key located on the operator's console and implemented in safe technology, said at least one key operating the key authentication switch so as to identify an operator before switching between the operating modes; and an operator's console of the controller receiving from the identification means a redundant binary enable signal if the operator is successfully identified, wherein the at least one key enables the operator to switch between the operating modes if the operator's console receives from the identification means the enable signal and determines that the enable signal is error-free.

4. The device of claim 3, wherein the identification means are externally connected to the operator's console.

5. The device of claim 3, wherein the key authentication switch is configured so that the key operating the key authentication switch, when released, automatically returns to an initial position and interrupts the enable signal.

6. The device of claim 3, further comprising second identification means connected in parallel with the identification means, wherein the second identification means is selected form the group consisting of an identification card, a transponder and a biometric device.

7. The device of claim 6, wherein the biometric device comprises a fingerprint scanner or a retina scanner.

8. The device of claim 3, wherein the identification means are internal to the operator's console.

* * * * *